(12) United States Patent
Ma et al.

(10) Patent No.: US 7,640,023 B2
(45) Date of Patent: Dec. 29, 2009

(54) SYSTEM AND METHOD FOR SERVER FARM RESOURCE ALLOCATION

(75) Inventors: Weimin Ma, Cupertino, CA (US); Ashish Chandwadkar, Morrisville, NC (US); Chris O'Rourke, Apex, NC (US); Robert Batz, Raleigh, NC (US); Kevin Shatzkamer, New York, NY (US); Anand K. Oswal, Sunnyvale, CA (US); Mark Grayson, Maidenhead (GB); Jayaraman Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 437 days.

(21) Appl. No.: 11/417,960

(22) Filed: May 3, 2006

(65) Prior Publication Data

US 2007/0258465 A1 Nov. 8, 2007

(51) Int. Cl.
*H04W 72/00* (2009.01)
(52) U.S. Cl. .............. 455/453; 455/454; 455/450; 455/451; 455/452.1
(58) Field of Classification Search ............ 455/453, 455/454, 450, 451, 452.1
See application file for complete search history.

(56) References Cited

U.S. PATENT DOCUMENTS

| | | | |
|---|---|---|---|
| 6,374,297 B1 | 4/2002 | Wolf et al. | |
| 6,922,724 B1 | 7/2005 | Freeman et al. | |
| 6,944,678 B2 | 9/2005 | Lu et al. | |
| 6,976,090 B2 * | 12/2005 | Ben-Shaul et al. | 709/246 |
| 7,076,562 B2 * | 7/2006 | Singhal et al. | 709/232 |
| 2002/0010798 A1 * | 1/2002 | Ben-Shaul et al. | 709/247 |
| 2003/0108052 A1 * | 6/2003 | Inoue et al. | 370/399 |
| 2004/0054794 A1 * | 3/2004 | Lantto et al. | 709/229 |
| 2005/0021818 A1 * | 1/2005 | Singhal et al. | 709/232 |
| 2005/0193010 A1 * | 9/2005 | DeShan et al. | 707/104.1 |
| 2005/0249199 A1 | 11/2005 | Albert et al. | |
| 2006/0067216 A1 | 3/2006 | Lalonde et al. | |
| 2006/0114832 A1 * | 6/2006 | Hamilton et al. | 370/244 |
| 2007/0069030 A1 * | 3/2007 | Sauerwein et al. | 235/462.46 |

OTHER PUBLICATIONS

IOS Server Load Balancing Feature in IOS Release 12.2(18)SXE: Cisco Systems, Inc. http://www.cisco.com/univercd/cc/td/doc/product/software/ios122/122newft/122limit/122sx/12218sce/slbsxe1.htm#wp3633221 "RADIUS Load Balancing Configuration Task List".
Cisco Systems, Inc. "Configuring Advanced Server Load Balancing" http://www.cisco.com/en/US/products/hw/switches/ps708/module_installation_and_configuration_guides_chapter 09186a00800fec10.html.

* cited by examiner

*Primary Examiner*—Thang V Tran
*Assistant Examiner*—Huy D Nguyen
(74) *Attorney, Agent, or Firm*—Trellis IP Law Group, PC

(57) ABSTRACT

Techniques and systems for server farm load balancing and resource allocation are disclosed. In one embodiment, a method of load balancing can include: arranging servers into service groups; receiving an access request with information related to a differentiation between the service groups; selecting one of the service groups based on a mapping comparison to the information; and selecting one of the servers within the selected service group based on a hardware utilization comparison. The servers can include GPRS (General Packet Radio Service) Gateway Support Node (GGSN) or Remote Authentication Dial In User Service (RADIUS) servers, for example. The information can include an Access Point Name (APN) or Calling Station ID, for example.

27 Claims, 5 Drawing Sheets

SYSTEM AND METHOD FOR SERVER FARM RESOURCE ALLOCATION

BACKGROUND OF THE INVENTION

Embodiments of the present invention relate in general to load balancing systems and, more specifically, to systems and methods for server farm resource allocation and load balancing.

In many modern server farm applications, load balancing is done strictly on a hardware utilization basis. For example, the servers in a particular server farm can be compared based on processor and/or memory utilization and incoming traffic can be routed accordingly to a least utilized server in that server farm. One drawback of this approach for GPRS (General Packet Radio Service) Gateway Support Node (GGSN) servers is that many may be limited in terms of support capability (e.g., may support IPv4, but not IPv6 Packet Data Protocol (PDP) types). External (e.g., Domain Name Service (DNS)) provisioning approaches have been used, but these may not provide an efficient use of public Internet Protocol (IP) addresses.

In addition, for Remote Authentication Dial In User Service (RADIUS) systems utilized in AAA (authentication, authorization, and accounting) protocols, specific information communicated by an AAA server may not be used by a Server Load Balancer (SLB) to make intelligent decisions for traffic direction. What is needed is a system and method of server load balancing and resource allocation that can utilize information in an access request to better direct traffic based on server capability.

DETAILED DESCRIPTION OF EMBODIMENTS OF THE INVENTION

Embodiments of the present invention can provide a system and method of server load balancing that can utilize information in or related to an access request to better direct traffic based on server capability. Advantages of embodiments of the present invention include efficient allocation of server farm resources, relative ease of tracking users, the ability to hide lack of support of a server for certain connection types, and the lack of any external provisioning.

Also, embodiments of the present invention can allow for improved AAA (authentication, authorization, and accounting) load balancing in an Extensible Authentication Protocol Method for Global System for Mobile Communications (GSM) Subscriber Identity Module (SIM), or EAP-SIM, environment. Such improvements can includes access via 3GPP (Third Generation Partnership Project) GAN (General Access Network), UMA (Unlicensed Mobile Access), public wireless Local Area Network (LAN) deployments, and/or IP Multimedia Subsystem (IMS) for authentication applications.

Figure 1:
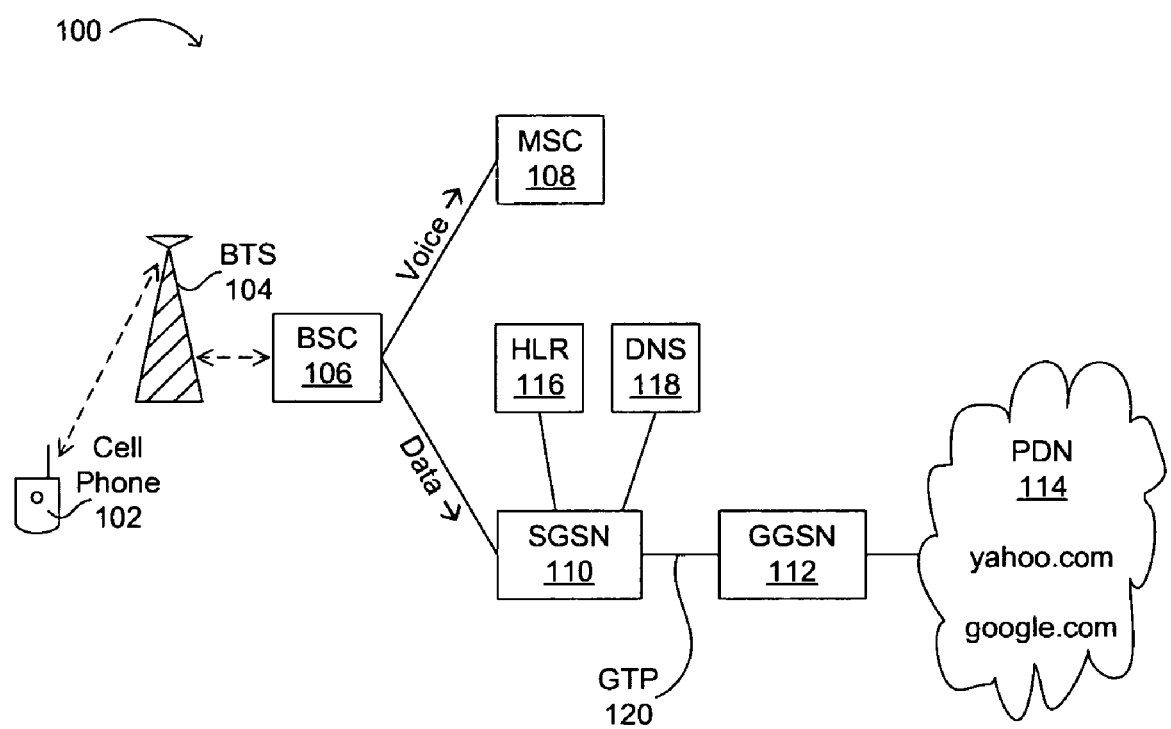
FIG. 1 depicts an exemplary GPRS network suitable for use in accordance with embodiments of the present invention.

Referring now to FIG. 1, an exemplary GPRS network suitable for use in accordance with embodiments of the present invention is shown and indicated by the general reference character 100. Such a network can employ Universal Mobile Telecommunications System (UMTS) Radio Access Network (UTRAN) operable using the 2.1 GHz, 1.8 GHz, 900 MHz and/or 2.6 GHz standards.

Cell phone 102 calls can be received/transmitted by Base Transceiver Station (BTS) 104, which can interface with Base Station Controller (BSC) 106. If a call from cell phone 102 is a voice call, it can be routed to Mobile Switching Center (MSC) 108. However, if the call or access request is a data call, it can be routed to Serving GPRS (General Packet Radio Service) Support Node (SGSN) 110. Gateway GPRS Support Node (GGSN) 112 can be a server and/or part of a switch/router, for example. Cell phone 102 can be any device (e.g., a laptop or another type of phone) that may be equipped to access the Internet (e.g., Public Data Network (PDN) 114) via a GPRS EDGE Radio Access Network (GERAN) or UTRAN, for example.

IP services that can be supplied to a mobile user of cell phone 102 may include services via GGSN 112, such as Quality of Service (QoS), IP address allocation, security, and billing/charging. Alternatively, a RADIUS (Remote Authentication Dial In User Service) system can additionally be deployed to provide IP address allocation and authentication/authorization. RADIUS is an AAA (authentication, authorization, and accounting) protocol for applications, such as network access or IP mobility, and will be discussed further below.

SGSN 110 can provide wireless service control for a user (e.g., a user of cell phone 102). Such service control can include a user profile via Home Location Registry (HLR) 116 and/or Domain Name Service (DNS) 118. Once a user connection is established and authenticated, the user information can be retrieved from a database stored on HLR 116. For example, a determination of the types of service that a particular user is authorized to utilize can occur in this fashion. Further, other parameters can also be supplied, such as QoS profile, access mode, and/or Access Point Name (APN). Also, cell phone 102 can have a user initially identified by IMSI (International Mobile Subscriber Identifier). With such information, SGSN 110 can route requests to HLR 116 in order to retrieve the appropriate subscriber information for this user.

Included in this information obtained by SGSN 110 can be an APN that the user is attempting to access from PDN 114, for example. Such an APN may be provided via a server coupled to an actual web site (e.g., yahoo.com or google.com) that the user wishes to access. An APN is essentially a logical name referring to a GGSN and an external network. To facilitate this accessing, SGSN 110 can determine which of several possible GGSNs (e.g., GGSN 112) should be utilized for the connection. Each such GGSN may be able to support a subset of all APNs or other local settings and/or configurations of the APNs allocated to a particular GGSN, for example. Further, in accordance with embodiments of the present invention, a virtual APN can allow for connection to any APN. Associated parameters can be received from another GGSN that might be mapped to an actual APN, for example.

GPRS Tunneling Protocol (GTP) 120 is used to set up a user connection between SGSN 110 and GGSN 112. Among the parameters in GTP 120 are Mobile Station IP (MSIP) address, QoS, access mode, and billing/charging characteristics, to name just a few. In one embodiment, this parameter information can be stored in GGSN 112. In operation, when SGSN 110 receives an access or activation request (e.g., initiated in cell phone 102), SGSN 110 can pass such associated GTP 120 to GGSN 112. The parameter information can be stored in GGSN 112 as part of a Packet Data Protocol (PDP), which can be a GTP session or context for each user. In essence, a PDP can be a signaling control block for support of a given user's data transport. Such a context can be set up prior to a send/receive of data, for example.

Figure 2:
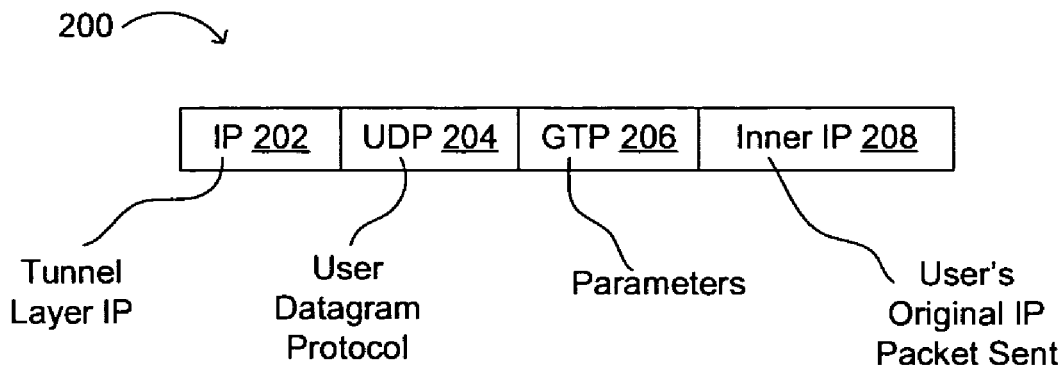
FIG. 2 depicts an exemplary GTP tunnel message suitable for use in accordance with embodiments of the present invention.

Once the PDP is set up, a user can send packets of data. Such packets can be provided from any suitable IP application (e.g., an e-mail program, a File Transfer Protocol (FTP) program, or a web program). The IP packets sent by the user can be encapsulated into GTP 120. Referring now to FIG. 2, an exemplary GTP tunnel message suitable for use in accordance with embodiments of the present invention is shown and indicated by the general reference character 200.

IP 202 can be a tunnel layer IP or outer layer IP for performing IP-related services for a current session only, for example. User Datagram Protocol (UDP) 204 can include a layer on which GTP can run. Inner IP 208 can include a user's original IP packet as sent. Inner IP 208 can be wrapped inside a GTP header (e.g., included in GTP 206 parameters).

In accordance with embodiments of the present invention, server farms (i.e., groups of servers) can be segregated based on their capabilities. For example, servers can be grouped based on support of Layer 4 (L4) through Layer 7 (L7) protocols. In conventional approaches, no further distinction was made so as to determine the most suitable server farm to handle a specific request. A Server Load Balancer (SLB) would simply support a single primary and backup server farm in order to serve all requests belonging to a particular service and/or protocol.

An exemplary mapping in accordance with embodiments of the present invention is shown below in Table 1. The map can define supported protocol attributes, assign such to a server farm, and also configure multiple mappings under a virtual server. Load balancing in accordance with embodiments of the present invention can then include selecting an appropriate server farm and load balancing within that server farm (e.g., by hardware utilization means).

TABLE 1

| Map/Server Farm (SF) | Serves (Capability) | Priority |
| --- | --- | --- |
| 1/SF 1 | SGSNs: 1.1.1.1/32, 2.2.2.0/24, 3.3.3.0/24 APNs: *.cisco.com | 3 |
| 2/SF 2 | PLMN ID: 111222, 33344 PDP type: Ipv4 | 2 |
| 3/SF 3 | PDP type: PPP | 5 |
| 4/SF 4 | SGSNs: 4.4.4.0/24, 5.5.5.0/24 APNs: abc.microsoft.com, xyz.intel.com PLMN IDs: 555666, 777888 PDP type: IPv4, PPP | 1 |
| 5/SF 5 | APN: yahoo.com | 4 |
| 6/SF 6 | All (default farm) | 6 |

Generally, if a particular parameter is not configured for a server farm, then that server farm supports that parameter. Following the example shown in Table 1, SF 1 can support all PDP types and Public Land Mobile Network (PLMN) IDs. A best fit server farm can be searched in an order of assigned priority (e.g., a lower number indicates a higher priority). In the above example, a search order based on the assigned priorities can be SF 4, SF 2, SF 1, SF 5, SF 3 and then SF 6. Once a match is found, the searching stops and no further server farms may be examined for that particular access request. In accordance with embodiments of the present invention, a higher priority can be assigned to more specific or other mappings.

Table 2 below shows exemplary requests and server farm selections based on the server farm mappings of Table 1. Access requests numbers ("#") are shown in the leftmost column and the server farm or service group selection according to the Table 1 mappings for this particular example are shown in the rightmost column of Table 2.

TABLE 2

| # | APN | SGSN | PLMN | PDP Type | Selection |
| --- | --- | --- | --- | --- | --- |
| 1 | abc.microsoft.com | 4.4.4.4 | 555666 | IPv4 | SF 4 |
| 2 | xyz.google.com | 10.10.10.10 | 987654 | PPP | SF 3 |
| 3 | abc.microsoft.com | 3.3.3.3 | 555666 | IPv4 | SF 6 |
| 4 | yahoo.com | 10.10.10.10 | 123456 | IPv4 | SF 5 |
| 5 | xyz.intel.com | 5.5.5.5 | 555666 | PPP | SF 4 |

In Table 2, for request #3, the default sever farm (SF 6) was chosen because there was not a more specific match available. Also, for request #5, either SF 3 or SF 4 could have satisfied the request parameters and/or information. However, SF 4 was chosen based on having a higher priority over SF 3. In this fashion, an increased protocol aware sever load balancer can be implemented. Accordingly, traffic can be segregated beyond a basic use of L4-L7 information to select an appropriate server farm best suited to service a request.

Figure 3:
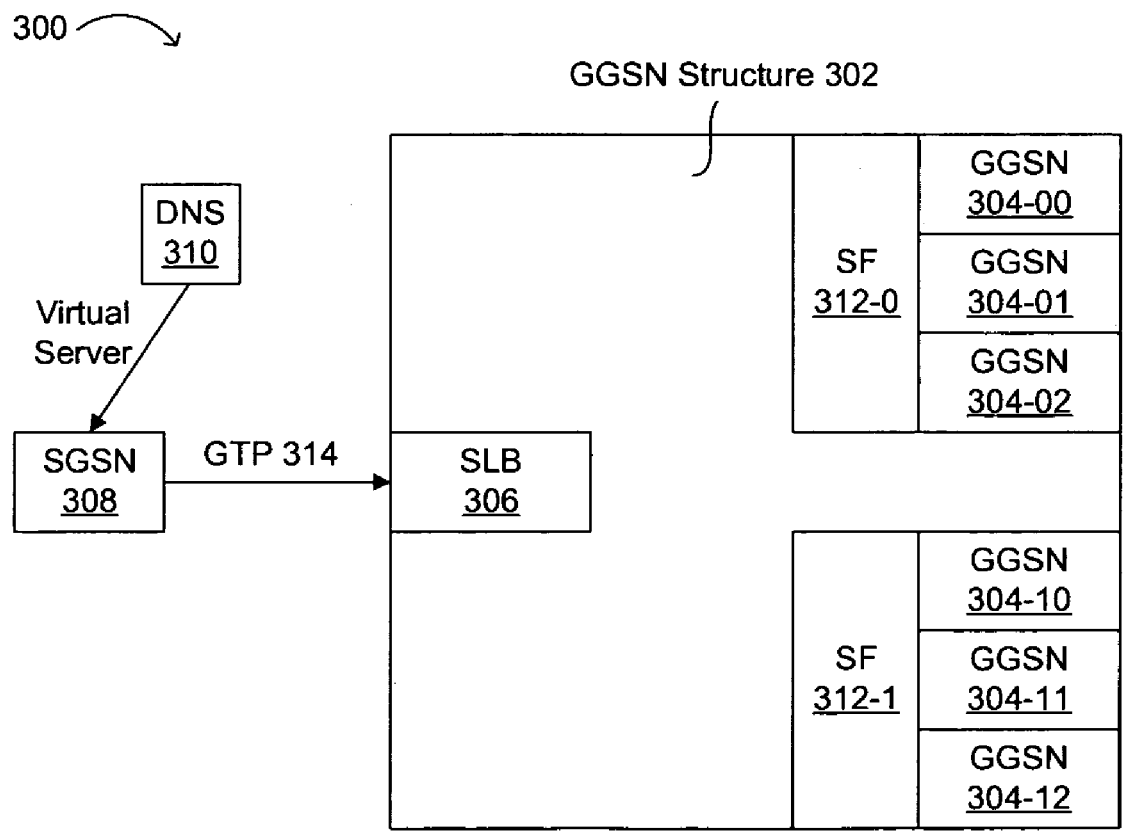
FIG. 3 depicts an exemplary GGSN structure in accordance with embodiments of the present invention.

Referring now to FIG. 3, an exemplary GGSN structure in accordance with embodiments of the present invention is shown and indicated by the general reference character 300. Server load balancer (SLB) 306 includes a virtual server. The virtual server in SLB 306 can contain the external overall IP address for all of GGSNs 304-00, 304-01, 304-02, 304-10, 304-11, and 304-12. GGSN structure 302 can be a switch/router or any other suitable hardware platform, for example.

In operation, DNS 310 can return the address of the virtual server to SGSN 308. GTP 314 can provide parametric information to SLB 306. In accordance with embodiments of the present invention, the virtual server can include separate and/or differentiated Server Farm (SF) groupings (e.g., SF 312-0 and SF 312-1). As one skilled in the art will recognize, more such SF groupings can be incorporated in accordance with embodiments, as appropriate for a particular application.

In conventional approaches, all GGSNs in a virtual server arrangement could have essentially the same set of APN services. As such, a conventional SLB would simply load balance among all associated GGSNs based on the hardware "load" (e.g., memory, processing units required and/or allocated). So, the more available resource, based purely on a hardware functional consideration, would be the GGSN selected by the associated SLB. Going forward, however, GGSNs are able to provide an increasingly complex set of services. In accordance with embodiments of the present invention, one group of GGSNs can be capable of performing a certain type of service, while another group can be capable of supporting a different type of service.

In accordance with embodiments of the present invention, another layer of abstraction may be introduced into a more conventional virtual server concept. Thus, one virtual server can contain multiple server farms, or groupings of servers, rather than one virtual server containing strictly a flat layer of GGSNs. Within a server farm or such grouping, all of the GGSNs therein can have essentially the same capabilities. Thus, GGSN 304-00, 304-01, and 304-02, can form SF 312-0 or a grouping where the GGSNs have the same capability. This capability can be differentiated from a capability allocated to the SF 312-1 grouping including GGSN 304-10, 304-11, and 304-12, for example.

Such capabilities can include IPv6 (i.e., only capable of activating IPv6 PDP contexts) versus IPv4 (i.e., only capable of activating IPv6 PDP contexts), for example. Other capability differences that can be defined include secure (IPsec) versus non-secure, APNs including "*.edu" versus APNs including "*.com," or any other suitable traffic management information. Accordingly, a preliminary step of selecting a most appropriate server farm, in addition to more traditional load balancing within that server farm, can be accomplished in accordance with embodiments of the present invention. This selection can be based on parameters (e.g., 206 of FIG. 2) and/or information contained in the GTP header, for example.

In operation, SLB 306 can inspect incoming GTP 314 to determine which server farm and/or group should be allocated based on the services or capabilities requested. Further, the actual load (e.g., hardware utilization) balance within a selected server farm and/or group can be used to select a GGSN to service the request. In one embodiment, associated logic for configuring the GGSNs into associated groups and/or for selecting a group to service an access request can be located in SLB 306.

Advantages of the present invention include grouping GGSNs having a same capability, as well as re-directing traffic based on those capabilities. Further, load balancing within a given group or with respect to all GGSNs based on traditional physical loads can also be supported. In accordance with embodiments of the present invention, GTP header APN information (e.g., IPv4) or other information related to an access request can be used to differentiate among GGSN groupings.

Figure 4:
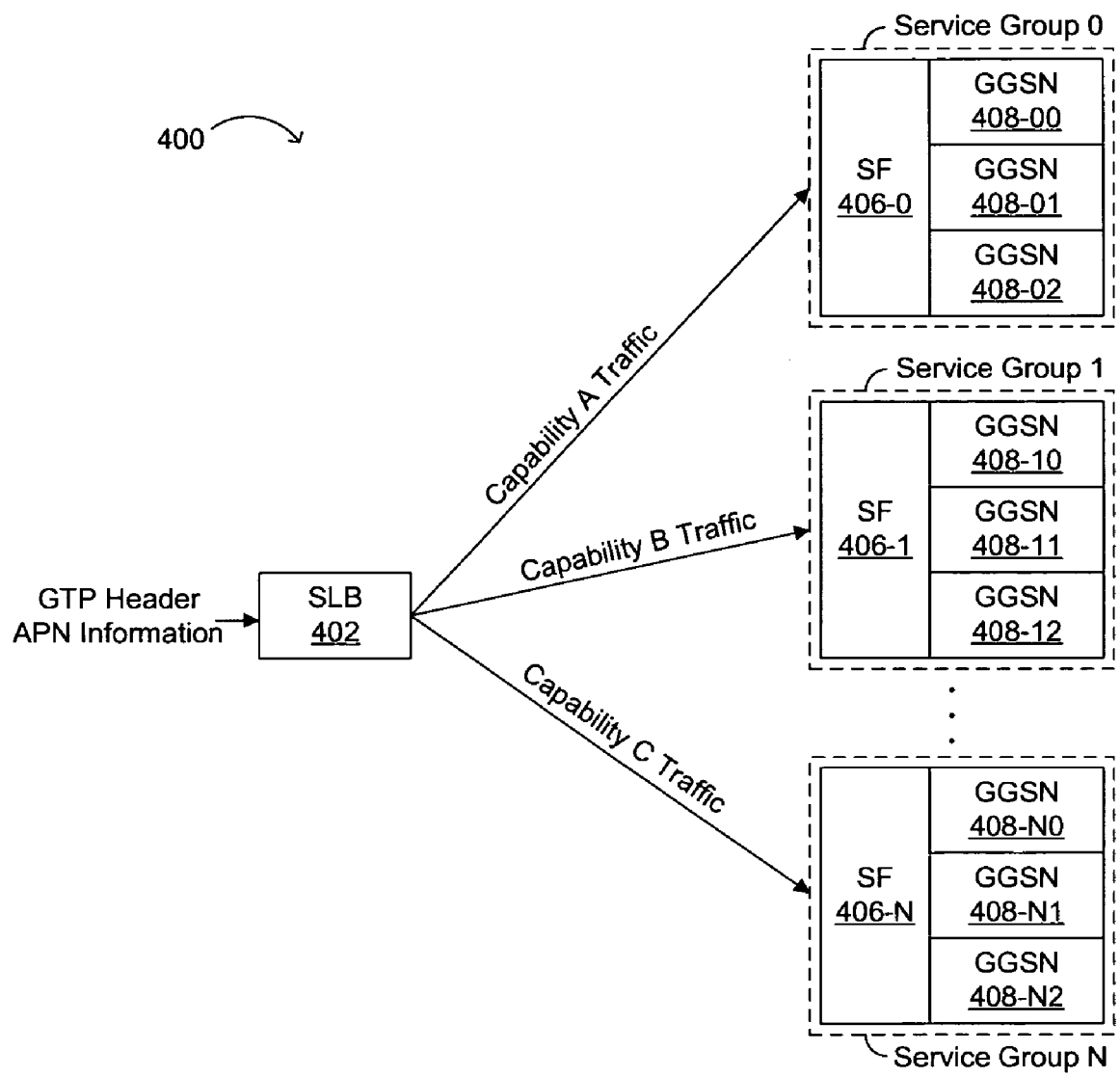
FIG. 4 depicts an exemplary virtual server arrangement for GGSN servers in accordance with embodiments of the present invention.

Referring now to FIG. 4, an exemplary virtual server arrangement for GGSN servers in accordance with embodiments of the present invention is shown and indicated by the general reference character 400. In this particular example, SLB 402 can receive GTP header APN information (e.g., from an associated SGSN). Servers configured as GGSNs can be grouped according to capabilities and/or services supported.

Service group 0 can include GGSNs 408-00, 408-01, and 408-02, as part of SF 406-0. Similarly, service group 1 can include GGSNs 408-10, 408-11, and 408-12, as part of SF 406-1, and so on through service group N including GGSNs 408-N0, 408-N1, and 408-N2, as part of SF 406-N. Incoming packets or access requests can have associated GTP header APN information analyzed by SLB 402 and the traffic may be directed accordingly. For example, a parser can be employed in SLB 402 to extract such information from an access request.

For example, if service group 0 includes GGSNs supporting an "A" capability (e.g., IPv6, IPv4, IPsec, or certain domain groups), capability A traffic can be directed to service group 0. Similarly, if service group 1 includes GGSNs supporting a "B" capability (i.e., some capability and/or services different from group 0), capability B traffic can be directed to service group 1. In like fashion, capability "C" traffic can be re-directed to service group N. In addition, while each GGSN in the particular example of FIG. 4 is only shown in one service group, a given GGSN can have both "B" and "C" capabilities, for example, and can be included in multiple service groups.

Further, as discussed above with reference to Tables 1 and 2, a priority can also be attached to each server farm and/or service group. As such, this priority can determine an order of searching among server farms such that a highest priority group that is capable of supporting a particular request can be selected to handle that request.

Either in parallel to this functional activity or once a traffic direction is determined to a particular service group, load balancing among GGSNs with the same capability (i.e., in the same service group) can be performed. Such intra-service group load balancing can be done based on processing and/or memory (i.e., lowest utilization) resource considerations. In this fashion, a GGSN most suited to service a request in terms of both hardware load utilization as well as a prioritized capability determination can be selected to service the request.

An enhanced Gateway GPRS Support Node (GGSN) is operable to support a generic authentication framework for an Evolved UMTS Radio Access Network (E-UTRAN) whereby the Extensible Authentication Protocol (EAP) may be used as a framework for authenticating E-UTRAN users. The EAP framework can allow support for any EAP authentication method, including EAP-TLS, EAP-PEAP, EAP-AKA and/or EAP-SIM, for example. When supporting EAP-SIM, the enhanced GGSN (e.g., 112) may be in communication with a RADIUS server which can terminate the EAP-SIM protocol and communicate with an HLR (e.g., 116) in order to recover authentication credentials for a cell phone (e.g., 102), for example.

In accordance with embodiments of the present invention, a RADIUS protocol can be supported by making a server farm selection based on RADIUS payload messages, for example. Dynamic load balancing can be performed by parsing RADIUS attributes, including a user name, a calling station ID, IMSI-allowed user-based load balancing decisions, or a Realm in a user's IMSI, for example. In particular, a statistical mapping between a real server to be selected for traffic and a Realm in a user's IMSI can be performed to optimize load balancing. If no match occurs using this approach, a default RADIUS load balancing method can be employed for a given request.

For example, an EAP-SIM fast re-authentication can allow for the communication of a pseudo-IMSI between a RADIUS server and a RADIUS client integrated in an enhanced GGSN (e.g., 112) using a RADIUS access accept message. This can enable a re-authentication of a user without a RADIUS server querying an HLR (e.g., 116). In the associated access accept message, such a pseudo-IMSI can be communicated via an encrypted EAP payload in order to be essentially invisible to intermediate elements. In one embodiment of the present invention, a new RADIUS access request can go to the same RADIUS server that issued the associated pseudo-IMSI. A load balancer can utilize a pseudo-domain extension on the IMSI in order to correlate to a specific server, for example.

Figure 5:
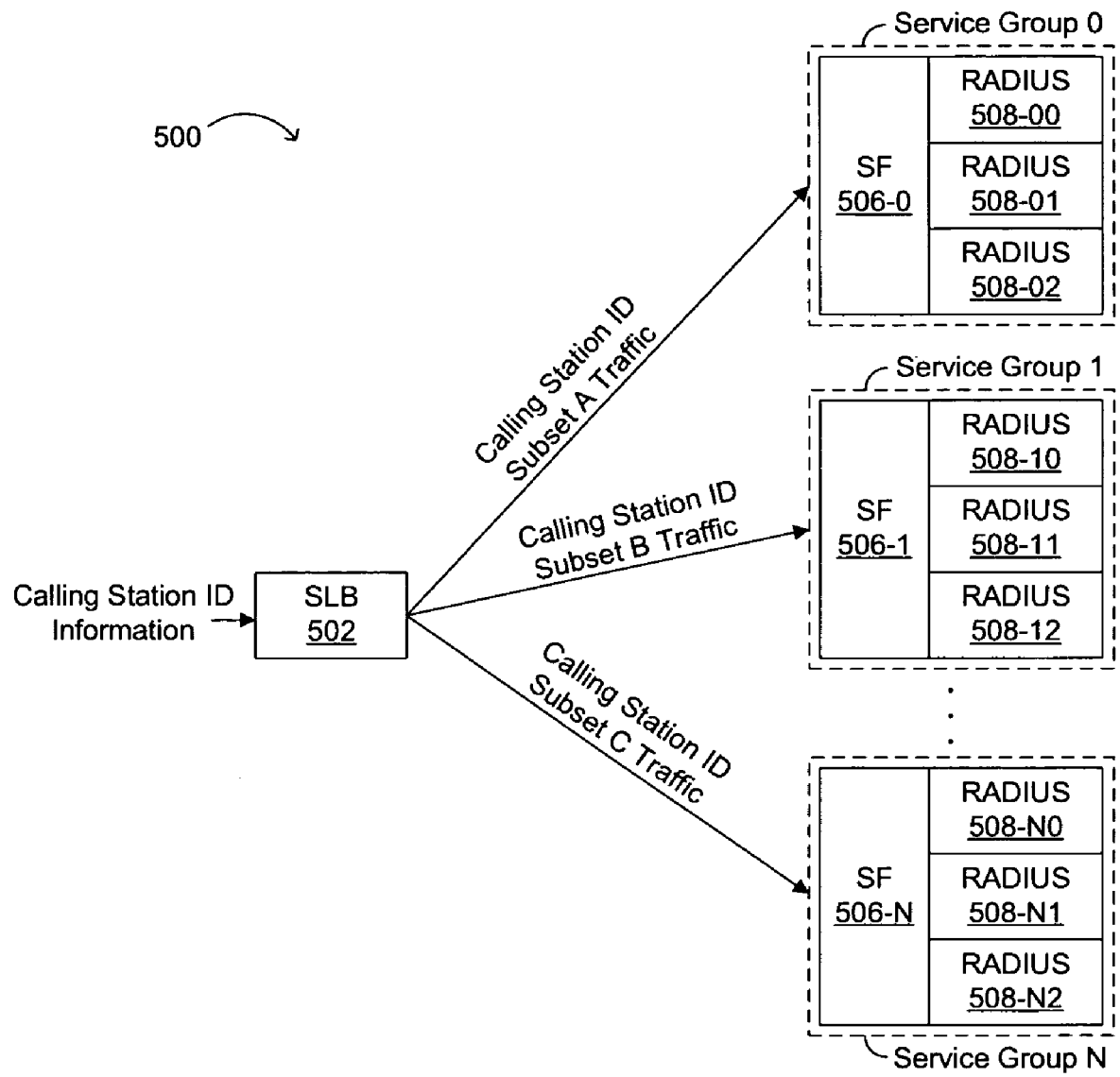
FIG. 5 depicts an exemplary virtual server arrangement for RADIUS servers in accordance with embodiments of the present invention.

In one embodiment, a calling station identification (ID) or an equivalent of a user name in a RADIUS application can be employed for server farm selection. Referring now to FIG. 5, an exemplary virtual server arrangement for RADIUS servers in accordance with embodiments of the present invention is shown and indicated by the general reference character 500.

In this particular example, SLB 502 can receive calling station ID information (e.g., from a GGSN, or the like). Servers configured as RADIUS servers can be grouped according to capabilities and/or services supported. Service group 0 can include RADIUS servers 508-00, 508-01, and 508-02, as part of SF 506-0. Similarly, service group 1 can include RADIUS servers 508-10, 508-11, and 508-12, as part of SF 506-1, and so on through service group N including RADIUS servers 508-N0, 508-N1, and 508-N2, as part of SF 506-N. Incoming packets or access requests can have associated calling station ID information analyzed by SLB 502 and the traffic may be directed accordingly.

For example, if service group 0 is configured to support a calling station ID subset "A" traffic, incoming packets having a calling station ID within this subset can be directed to service group 0. Similarly, if service group 1 includes RADIUS servers supporting a calling station ID subset "B" capability, such traffic can be directed to service group 1. In like fashion, calling station ID subset "C" traffic can be re-directed to service group N. Either in parallel to this functional activity or once a traffic direction is accomplished to a particular service group, load balancing among RADIUS servers within the same service group can be performed. Such intra-service group load balancing can be done based on processing and/or memory (i.e., lowest utilization) resource considerations.

Figure 6:
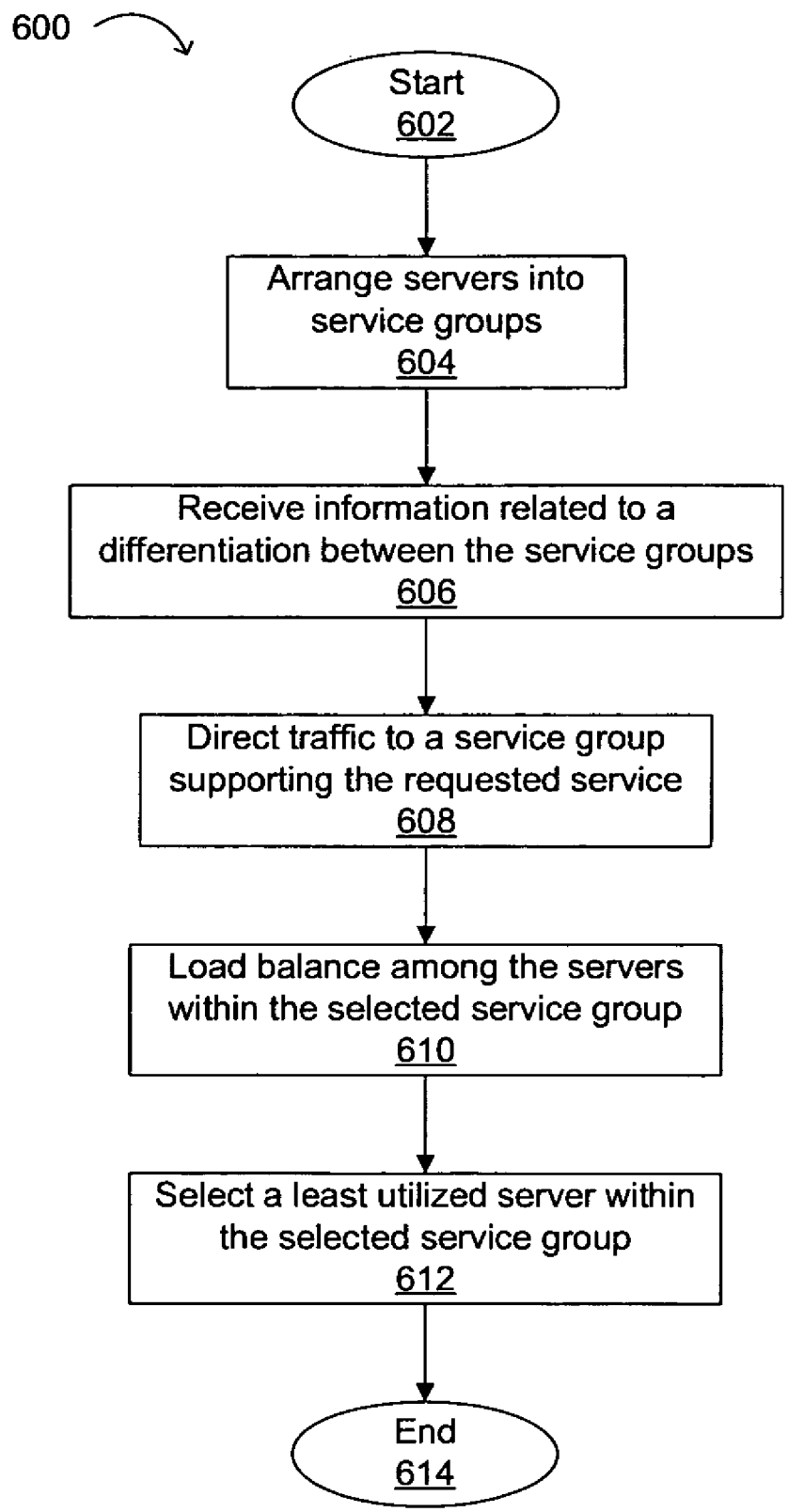
FIG. 6 depicts a simplified flow chart of a method of performing server load balancing and allocation in accordance with embodiments of the present invention.

Referring now to FIG. 6, a simplified flow chart of a method of performing server load balancing and allocation in accordance with embodiments of the present invention is shown and indicated by the general reference character 600. The flow can begin (602) and servers can be arranged into service groups (604). The servers can be GGSNs and/or RADIUS type servers, for example. In one embodiment, the server arrangement can be accomplished using a virtual server approach.

Information can be received (e.g., by a server load balancer) related to a differentiation between the service groups (606). This information can be part of or related to an access request. For a GGSN system, this differentiation may be based on the capabilities supported. For a RADIUS system, this differentiation may be based on a subset of calling station IDs, for example. Traffic can then be directed to a service group supporting the requested service (608).

Load balancing based on hardware utilization principles can be performed among the servers within the selected service group (610). Based on this, a least utilized server within the selected service group can be selected (612) and the flow can complete (614). In this fashion, an access request can be optimized by being directed to an appropriate server having favorable utilization characteristics.

Although GGSN and RADIUS systems are primarily described herein, it will be understood that other types of servers and/or protocols may be appreciated by persons skilled in the art. For example, any type of server suitable for allocation into service groups can be accommodated in accordance with embodiments. Further, land, mobile, or other general types of communication protocols can be employed in accordance with embodiments. For example, other variations of Mobile IP home agent load balancing, load balancing of SIP messages to server farms based on payload, or TACACS or Diameter (rather than RADIUS) can be utilized in accordance with embodiments.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Further, distributed, or networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method of server load balancing between a plurality of servers arranged into a plurality of service groups, the method comprising:

receiving an access request having requested server capability information for processing of the access request, the plurality of service groups being arranged based on server group capabilities, the server group capabilities representing at least one server capability that is common among the servers arranged in each service group;

determining a highest priority match among the plurality of service groups by comparing the requested server capability information against the server group capabilities in a priority order from a most specific of the server group capabilities to a least specific of the server group capabilities, the priority order being derived using the requested server capability information, wherein the highest priority match determination among the plurality of service groups is made without regard to any hardware utilization comparisons;

selecting one of the plurality of service groups for processing the access request based on the highest priority match determination; and selecting one of the plurality of servers within the selected service group based on a hardware utilization comparison among servers within the selected service group.

2. The method of claim 1, wherein each of the plurality of service groups includes a server farm.

3. The method of claim 1, wherein the plurality of servers includes a GPRS (General Packet Radio Service) Gateway Support Node (GGSN).

4. The method of claim 3, wherein the requested server capability information includes GPRS Tunneling Protocol (GTP) Access Point Name (APN) information.

5. The method of claim 3, wherein the requested server capability information includes a Packet Data Protocol (PDP) type.

6. The method of claim 1, wherein the plurality of servers includes a Remote Authentication Dial In User Service (RADIUS) server.

7. The method of claim 6, wherein the requested server capability information includes calling station identification information.

8. The method of claim 1, wherein the plurality of servers are arranged into the plurality of service groups using a virtual server.

9. The method of claim 1, wherein the receiving the access request and directing traffic to the selected server in the selected server group uses a Server Load Balancer (SLB).

10. The method of claim 1, further comprising assigning a priority to each of the plurality of service groups for the highest priority match determination.

11. The method of claim 10, wherein the determining the highest priority match includes choosing a service group having a highest assigned priority when at least two of the plurality of service groups have requested server capability suitable for the processing of the access request.

12. A Server Load Balancer (SLB) configured to direct traffic to one of a plurality of service groups, the SLB comprising:

a processor;

an input configured to receive an access request, the access request having requested server capability information for processing of the access request, the plurality of service groups being arranged based on server group capabilities, the server group capabilities representing at least one server capability that is common among servers arranged in each service group;

a parser configured to extract the requested server capability information from the access request;

logic encoded in one or more tangible media for execution by the processor, and when executed operable to determine a highest priority match among the plurality of service groups by comparing the requested server capability information against the server group capabilities in a priority order from a most specific of the server group capabilities to a least specific of the server group capabilities, the priority order being derived using the requested server capability information, wherein the highest priority match determination among the plurality of service groups is made without regard to any hardware utilization comparisons; and an output configured to provide the service group selection for processing the access request based on the highest priority match determination.

13. The SLB of claim 12, wherein each of the plurality of service groups includes a server farm.

14. The SLB of claim 12, wherein each of the plurality of service groups includes a plurality of servers.

15. The SLB of claim 14, wherein the plurality of servers includes a GPRS (General Packet Radio Service) Gateway Support Node (GGSN).

16. The SLB of claim 15, wherein the requested server capability information includes GPRS Tunneling Protocol (GTP) Access Point Name (APN) information.

17. The SLB of claim 15, wherein the requested server capability information includes a Packet Data Protocol (PDP) type.

18. The SLB of claim 14, wherein the plurality of servers includes a Remote Authentication Dial In User Service (RADIUS) server.

19. The SLB of claim 18, wherein the requested server capability information includes calling station identification information.

20. A system for load balancing, the system comprising:
a first service group having a plurality of first servers, each of the plurality of first servers having a first characteristic;
a second service group having a plurality of second servers, each of the plurality of second servers having a second characteristic; and
a Server Load Balancer (SLB) coupled to the first and second service groups, the SLB being configured to receive an access request having requested server capability information for processing of the access request, the SLB comprising:
a processor; and
logic encoded in one or more tangible media for execution by the processor, and when executed operable to determine a highest priority match among the first and second service groups by comparing the requested server capability information against the first and second characteristics in a priority order from a most specific of the first and second characteristics to a least specific of the first and second characteristics, the priority order being derived using the requested server capability information, wherein the highest priority match determination among the first and second service groups is made without regard to any hardware utilization comparisons.

21. The system of claim 20, wherein the first and second service groups each includes a server farm.

22. The system of claim 20, wherein the plurality of first servers and the plurality of second servers each includes a GPRS (General Packet Radio Service) Gateway Support Node (GGSN).

23. The system of claim 22, wherein the requested server capability information includes GPRS Tunneling Protocol (GTP) Access Point Name (APN) information.

24. The system of claim 22, wherein the requested server capability information includes a Packet Data Protocol (PDP) type.

25. The system of claim 22, wherein the plurality of first servers and the plurality of second servers each includes a Remote Authentication Dial In User Service (RADIUS) server.

26. The system of claim 25, wherein the requested server capability information includes calling station identification information.

27. An apparatus for server load balancing between a plurality of servers arranged into a plurality of service groups, the apparatus comprising:
means for receiving an access request having requested server capability information for processing of the access request, the plurality of service groups being arranged based on server group capabilities, the server group capabilities representing at least one server capability that is common among the servers arranged in each service group;
means for determining a highest priority match among the plurality of service groups by comparing the requested server capability information against the server group capabilities in a priority order from a most specific of the server group capabilities to a least specific of the server group capabilities, the priority order being derived using the requested server capability information, wherein the highest priority match determination among the plurality of service groups is made without regard to any hardware utilization comparisons;
means for selecting one of the plurality of service groups for processing the access request based on the highest priority match determination; and
means for selecting one of the plurality of servers within the selected service group based on a hardware utilization comparison among servers within the selected service group.

* * * * *

UNITED STATES PATENT AND TRADEMARK OFFICE
CERTIFICATE OF CORRECTION

PATENT NO. : 7,640,023 B2  Page 1 of 1
APPLICATION NO. : 11/417960
DATED : December 29, 2009
INVENTOR(S) : Ma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this

Twenty-first Day of December, 2010

David J. Kappos
*Director of the United States Patent and Trademark Office*